United States Patent Office 3,175,432
Patented Mar. 30, 1965

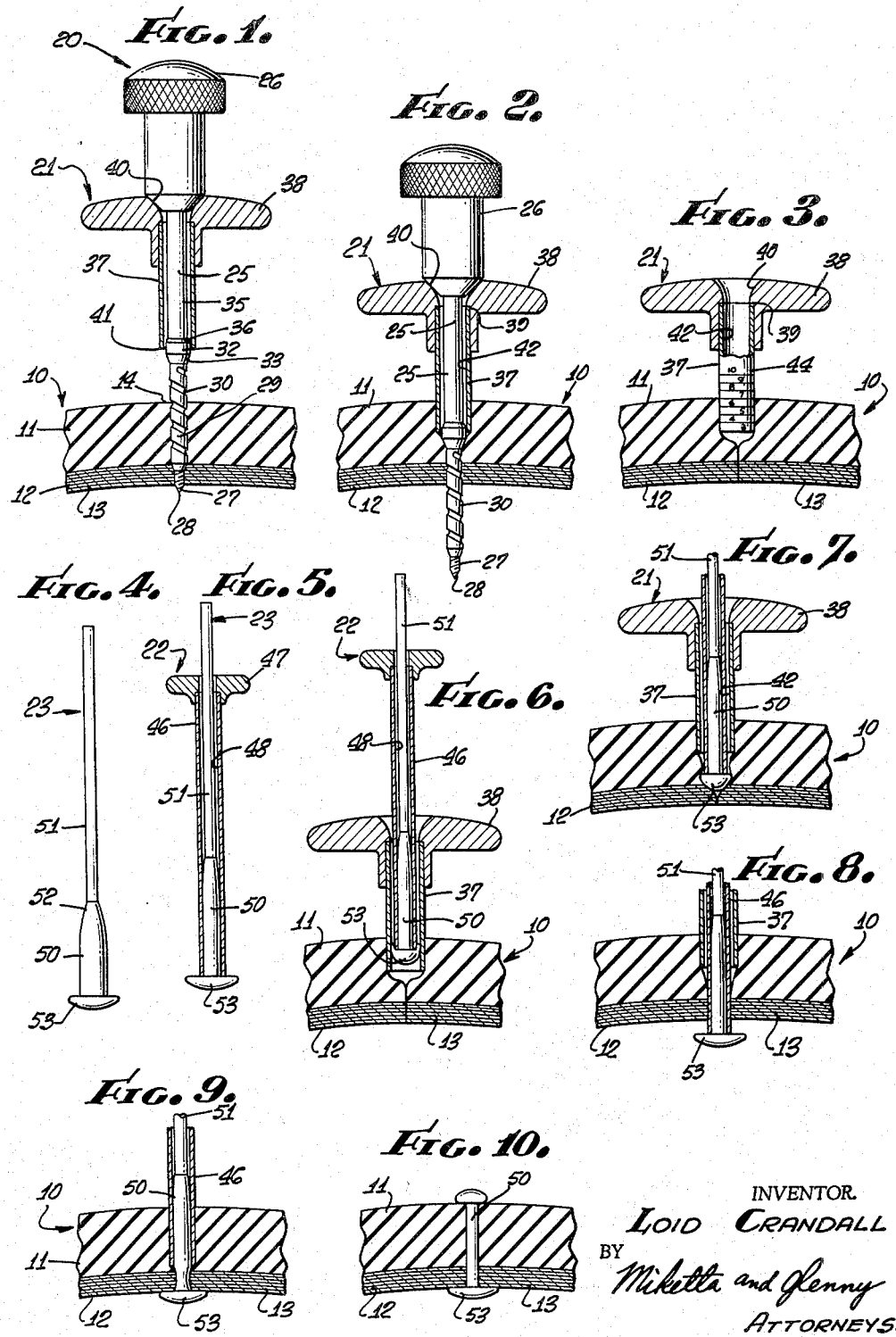

3,175,432
TIRE REPAIR TOOL AND METHOD
Loid Crandall, 2029 Highland Oaks Drive, Arcadia, Calif.
Filed Sept. 11, 1961, Ser. No. 137,104
5 Claims. (Cl. 81—15.7)

This invention relates to a means and a method for repairing puncture holes in tubeless type vehicle tires or like resilient wall constructions for maintaining fluid under pressure. The invention particularly relates to a tire repair tool adapted to facilitate repair of puncture holes which permit slow leakage of fluid pressure from the tire and wherein such repair can be accomplished with a minimum reduction of fluid pressure in the tire.

Prior proposed tire repair devices have included various shapes and arrangements of tools for insertion into a puncture hole in a tire wall of resilient plugs or plug elements for repairing such tire walls. Certain of such proposed tire repair devices are shown in my Letters Patent 2,931,261 and 2,990,736.

It is highly desirable in repairing a puncture hole in a tubeless tire wall that the resilient material of the wall be undisturbed as much as possible and in particular that the cords and reinforcing fibers of the tire be not cut, abraded or otherwise partially destroyed which might tend to weaken the wall strength. It is also desirable that some pressure air be maintained in the tire to facilitate repair by partially supporting the tire wall. When tire repairs are made at a service station or where a source of air pressure is readily available, escape of all of the air or a complete reduction of tire pressure is not critical because a source of air pressure is readily available and pressure air may be temporarily injected into a tire in order to support the tire wall while a repair is being made. However, when a slow leak or the presence of a nail is discovered while traveling and away from a source of pressure air and a repair is desired to be made promptly before such a nail further damages the tire wall, repairs of such tires become difficult if air is completely evacuated from the tire either before or during the tire repair operation. Moreover, if a source of air is not readily available, the conservation of as much fluid pressure in the tire during the repair is highly desirable.

Rapid escape or forceful blowout of pressure air from the tire during a repair operation is not desirable. In some prior devices utilizing a hole expander through which a plug is passed, the forceful escape of air through the open passageway provided by the expander rapidly dried cement on the surfaces of the plug head being introduced into the hole. Such cement was intended to lubricate the plug head in its passage, but contact with the stream of air through the expander often dried the cement and caused sticking and binding of the plug and plug carrier in the expander. Unless the repair operation was accomplished without hesitation, the plug and carrier could jam in the expander. Therefore, insertion of a plug element with cement thereon into the outer portion of a puncture hole in the absence of a stream of pressure air, or in which volume and velocity of escaping pressure air is not unnecessarily increased, but is held to a minimum, facilitates the lubricated passage of a plug head through the tire wall.

The present invention contemplates a novel tire repair tool and method whereby the tire wall is subjected to minimum expansion of the tire puncture hole, the cord section of the tire is disturbed as little as possible, and whereby a puncture hole may be repaired with a minimum loss or reduction of fluid pressure in the tire.

The present invention, therefore, contemplates a tire repair tool and method for facilitating rapid effective repairs of puncture holes in tubeless tires. The invention contemplates a tool and a method whereby a puncture hole is substantially blocked against passage of air therein during the entire repair operation. The tire repair tool of the present invention may be readily used with repair plugs of different shapes and configuration.

Among the more important objects and advantages of the present invention are the provision of a probe member which positively wipes puncture hole wall surfaces with a bonding substance such as adhesive or cement; the use of such substance to assist in temporary obstruction of passage of air through an inner portion of the puncture hole during the repair operation; the maintenance of temporary expansion of only the outer portion of the puncture hole while the inner portion of the puncture hole is permitted to return to its virtually normal state with adhesive therein; the provision of means for positively determining the depth of such expanded outer portion of the puncture hole; and the elimination of steps in a method of repairing a puncture hole so that the hole may be rapidly and effectively repaired with a minimum of tool handling.

Various other objects and advantages of the present invention will be readily apparent from the description of the drawings which show an exemplary embodiment of this invention.

In the drawings:

FIG. 1 is a sectional view of a tire repair tool embodying this invention with a probe member and a guide member in assembly with the probe member introduced into a puncture hole in a tire wall.

FIG. 2 is a sectional view taken in the same plane as FIG. 1 with the guide member located in the tire wall for expansion of the upper portion of the hole.

FIG. 3 is a view similar to FIGS. 1 and 2 with the probe member removed.

FIG. 4 is a side view of a tire repair plug which may be used with this invention.

FIG. 5 is a sectional view of a plug carrier and a plug element therein as used with the tire repair tool of this invention.

FIGS. 6, 7, 8, 9 and 10 are fragmentary sectional views showing successive positions of a plug element as it is inserted and positioned in the puncture hole.

In FIG. 1 a tubeless tire 10 is fragmentarily shown and is constructed with a resilient tire wall having a tread portion 11 and a reinforcing cord section 12 having continuous reinforcing fibers, elements or cords 13 embedded therein to provide structural strength as is well known in tire construction. The tread portion 11 will vary in thickness depending upon wear of the tire. A puncture hole 14 is indicated in the tire wall. The puncture hole 14 may vary in size and in direction depending upon the nail or other foreign object which has caused hole 14. Normally, the resiliency of the material in the tread portion and in the cord portion tends to grip the object and to close such a puncture hole. Often, a nail causing the puncture will permit only slow leaks in the tire. It is desirable, however, that the nail be removed so that continual working of the nail in the hole will not further damage the resilient material and cords of the tire wall and thus cause more extensive damage to the tire wall. It will be understood, of course, while a tubeless vehicle tire is referred to, the tire 10 may be any type of hollow fluid pressure containing member having a resilient wall construction.

A tire repair tool embodying this invention comprises generally a probe and applicator member 20, a guide and depth indicator member 21, and a plug carrier member 22. A repair plug element indicated at 23 is illustrative of one shape of a tire repair plug element adapted for use with the tire repair tool of this invention.

The probe and applicator member 20 may comprise a shank member 25 of solid rigid metal material having a pressure head 26 at one end suitably shaped for pressing a hand thereagainst and for turning or rotating the probe member when it is in a puncture hole. The upper end of shank 25 may be embedded, bonded, or fixed in any suitable manner to the head 26. At its other end, the shank member 25 has a probe tip 27 with a blunt rounded end 28. The surfaces of probe tip 27 may be provided with relatively steeply inclined righthand thread, striation, or a knurled surface in order to facilitate initial entry and progress of the probe tip 27 into and along the hole. Such striations serve to prepare the surface portions of puncture hole 14 for application of a liquid cement or adhesive as later described and to hold the probe member in the hole.

Above the probe tip 27 is provided a grooved portion 29 of slightly greater diameter, the lower surfaces of portion 29 smoothly merging with the surfaces of probe tip 27. Portion 29 may be provided with a continuous lefthand spiral groove or thread 30 of any selected depth adapted to carry ample quantities of a bonding substance such as adhesive or rubber cement, applied thereto by simply dipping the portion 29 into a quantity of such cement or by spreading the cement on the probe. The length of portion 29 is relatively short and thereabove the shank member 25 is provided with an intermediate integral annular rib, ring or collar 32 of enlarged cross-section. The surfaces of collar 32 may be cylindrical and merge with surfaces of grooved portion 29 by a tapered or conical surface 33. Above collar 32, shank member 25 includes an elongated relief portion 35 merging at 36 with the surfaces of collar 32 relatively abruptly.

Guide member 21 may comprise a hollow cylindrical guide sleeve member 37 of relatively short length and having one end embedded and fixed in a transversely extending handle or head 38. The handle 38 provides an internal annular shoulder 39 against which the upper end of sleeve member 27 may seat. Above shoulder 39, handle 38 may be provided with an outwardly flared surface 40 adapted to provide a positioning seat in assembly for the lower end or shoulder of the head 26 on probe member 20. The opposite end of sleeve 37 is plain and annular edge 41 thereof may be provided with blunted or rounded edges of convex form so that sharp edges are eliminated. The guide member 21 provides a through passageway 42 adapted to receive shank member 25 of the probe member 20.

The guide member 21 may be ensleeved over the probe member 20 by inserting the probe tip 27 therein until the bottom portion of head 26 seats on outwardly flared surfaces 40 of the handle 30 on the guide member 21. In such assembled relation it will be noted that the selected internal diameter of the passageway 42 permits a relatively loose sliding fit across the cylindrical surfaces of collar 32 and that edge 41 is at the upper portion of the collar. The tapered surface 33, cylindrical surface of collar 32, and convex edge 41 of sleeve member 37 will produce progressive enlargement or expansion of a puncture hole, without damage thereto when the assembled members 20 and 21 are introduced thereinto.

The outer cylindrical surface of sleeve member 37 may be provided with transverse indicia means 44 at spaced intervals to indicate the distance from edge 41 of sleeve member 37. Such indicia means 44 may include numbers at indicia marks as indicated, or each of the transverse indicia means 44 may comprise a differently colored band for ready visual identification. In place of such indicia means, the invention contemplates that an axially positionable ring member may be slidably frictionally mounted on sleeve member 37 for selective positioning along the length thereof in order to preset the depth of penetration of the sleeve member 37 into the puncture hole since it is desired that only limited penetration of the sleeve member in the outer portion of such puncture hole be made.

The plug carrier means 22 may comprise a hollow, elongated cylindrical tube 46 provided at one end with a cap 47 fixed thereto in any suitable manner, said cap 47 having an opening whereby a through passageway 48 is provided in said plug carrier means 22. The outer diameter of tube 46 is substantially less than the inner diameter of sleeve member 37 to provide an annular space and its length is sufficient to project through a thickness of a tire wall when cap 47 is seated on handle 38.

Plug element 23 may be made of any suitable resilient material such as rubber composition, synthetic rubber composition, or other stretchable flowable materials. The plug element 23 may comprise a generally cylindrical body 50 of selected diameter depending upon the size of the puncture hole to be repaired. The body 50 is connected to an elongated narrow tail portion 51 by a suitable tapered portion 52, the tail portion 51 having a length sufficiently longer than plug carrier 22 so that tail portion 51 may be threaded or inserted through tube 46 and extend beyond cap 47 for grasping by fingers of a hand. Cylindrical body 50 may be provided at its opposite end with an enlarged annular flange or rib forming a head 53. A headed plug such as that shown in my Patent 2,990,736 may be employed if desired.

When the tire repair tool 20 of this invention is to be used, it is contemplated that a puncture hole 14 has been located in the tire 10. Before withdrawing a nail or other foreign object from the puncture hole, probe member 20 and guide member 21 may be assembled as shown in FIG. 1 and liquid cement or other suitable bonding substance may be applied only to the grooved portion 29 of shank member 25 which projects beyond the end of the sleeve member 37. When this is accomplished, the nail may be removed from the puncture hole and the assembled probe and guide members 20 and 21 may be introduced into said hole by placing the blunt probe tip 27 into the outer opening of the hole and hand pressing the assembly inwardly while turning probe member to the right (a normal motion for tightening or driving a screw). As soon as the nail is removed, some leakage of air will occur; however, the hole will tend to contract because of the resilient material of the tire. As soon as the probe tip is inserted into the hole, any such leakage will be substantially stopped. The assembly is then pressed inwardly and as the knurled surface of the probe tip 27 passes along the walls of the puncture hole, the knurled surface engages the wall surfaces of hole 14 to prevent expulsion of the probe member by the resilient wall in the event the applied hand pressure and twist is withdrawn or stopped.

As the grooved portion 29 enters and is received within the puncture hole, it will be apparent that the lefthand spiral groove 30 readily carries a substantial amount of liquid cement into said hole. While the grooved portion 29 is located in the hole, the probe may continue to be rotated to the right in a direction opposite to the pitch (lefthand) of the spiral groove 30 so that the wall of the groove opposed to the direction of rotation will positively cause the cement to be deposited upon and wiped against the walls of the puncture hole. Thus the provision of the left-hand spiral groove filled with cement on a probe member which is turned to the right, prevents expulsion of the cement from the groove (which would occur if a right-hand spiral was used with right twists or turns of the probe member) and drives the cement against the hole surfaces. The depth of penetration of probe member 20 may be readily seen for this part of the operation by reason of collar 32, which should be located at the outer surface of tread 11.

When this is accomplished the assembly may be pressed and turned further into the puncture hole until the lower end of sleeve member 37 is inserted into the tread portion 11 of the tire. The depth of such penetration may be readily seen and determined by examination of indicia 44. If tread portion 11 is worn, the depth of penetration should not be great because it is not desired to spread apart or further enlarge the cord section 12 of the tire more than that required by introducing grooved portion 29 of the probe member. Depth of penetration to the outer layer of cord section 12 may also be sensed or felt by the operator because upon contact with rounded edge 41 the cord section outer layer sets up a definite increased resistance to inward movement of the probe and guide members. Additional pressure is not applied; it is not desired to move the sleeve edge 41 beyond this point. The indicia 44 will assist in measuring such depth and edge 41 may be slightly retracted if desired to a location outwardly of the cord section. It will thus be apparent that only the upper portion of the puncture hole 14 is now expanded to a diameter which is the equivalent of the outer diameter of sleeve member 37, while the lower portion of the puncture hole has been expanded only to the diameter of the probe grooved portion 29.

When the proper depth penetration of the probe member and guide member 20 and 21 has been obtained, the probe member 20 may be withdrawn from the guide member and in such withdrawal, cement may be further deposited along walls of the puncture hole at cord section 12 and the interior surfaces of the tire wall adjacent hole 14.

Prior to the introduction of the probe and guide members into the puncture hole, plug element 23 may be assembled with the plug carrier 22. This is accomplished by inserting the tail portion 51 through tube 46 and then drawing and stretching plug element 23 into assembled relation with the tube as shown in FIG. 5. It will be apparent that the enlarged diameter of the cylindrical plug portion 50 will be reduced and placed under a condition of longitudinal tension and reduced section within the lower end of tube 46. The cylindrical body 50 is drawn into the end of tube 46 until head 53 is at the end of tube 46. The assembled plug element and plug carrier may then be introduced and inserted into guide member 21 and since the normal diameter of the cylindrical body 50 of the plug element 23 may be approximately that of the inner diameter of sleeve member 37, such introduction into the guide member 21 may be readily accomplished. A small quantity of liquid cement may be placed on head 53 for lubricating sliding movement of the head in member 21. The cement on the head will also be deposited on the walls of the inner portion of the hole. The cement is not subjected to a forceful stream of pressure air from the tire because the inner portion of the hole is substantially closed by cement and normal contraction thereof (FIG. 6). The plug carrier 22 and plug element 23 may then be pressed downwardly through sleeve 37 and as head 53 clears the end 41 of sleeve 37, it will be engaged by the walls of the puncture hole 14 at or above cord section 12. The head 53 may be pressed downwardly through the lower substantially closed portion of the puncture hole until the lower end of tube 47 clears the inner surface of the tire wall as indicated in FIG. 8.

The head 53, which has a larger diameter than the outer diameter of the tube 46, will upon withdrawal of the carrier 22 move into abutment with the surface margins of hole 14 on the interior surface of the tire wall and will be urged into abutting seating relationship therewith. As the plug carrier 22 is further withdrawn with guide member 21, the abutment of head 53 will cause the plug element 23 to be stripped from tube 46 and progressively deposited under a condition of longitudinal tension and reduced diameter against and within the lower portion of puncture hole 14. As the carrier 22 is further retracted, guide member 21 is withdrawn from the upper portion of the puncture hole 14 which contracts to ultimately grasp and hold in tight squeezed relation plug element 23 as it is deposited in said puncture hole.

After guide member 21 and carrier 22 have been completely withdrawn from the puncture hole, the plug element will be deposited in the puncture hole and will assume a configuration similar to that shown in FIG. 10. It is understood that the tail portion 51 and perhaps an upper portion of the cylindrical portion 50 may be severed at the outer face of the tread 11.

In the method of repairing a puncture hole as described above with the tire repair tool of this invention the puncture hole permits release of pressure air from the tire substantially only at the time when the nail making the puncture hole was withdrawn and before the probe and guide members were introduced into the hole. Withdrawal of the probe member 20 deposited liquid bonding substance in the hole which cooperated with the resiliency of the cord section of the tire to obstruct and block passage of air through the hole at this step in the operation. Thus, a tire may be rapidly and readily repaired on the road with a minimum loss of air.

It is important to note that during withdrawal of probe member 20 from guide member 21, the driving deposit and forcing of cement onto the walls of the puncture hole may result in the carrying out of said puncture hole some minute particles of rubber, foreign matter, or cement and such particles may become deposited upon internal wall surfaces of passageway 42. Such deposit of cement and minute particles tends to narrow passageway 42 so that upon subsequent insertion of probe member 20 into guide member 21 for repair of another puncture may cause partial temporary blocking of the passage of collar 32 through passageway 42. However, since collar 32 is normally loosely fitted within the passageway 42 and since probe 20 has a reduced section 35 above collar 32, it will be apparent that upon entry of the tapered portion 33 of collar 32 into passageway 42 and contact of the external surface of collar 32 with such minute particles deposited upon the wall of passageway 42 that such particles will be readily passed by collar 32 because of the reduced section 35 which serves as a relief area for such passed particles. Since the width of the external cylindrical surface on collar 32 is not great, build-up of particles between this surface and the walls of the passageway is not permitted and pressure binding of collar 32 with the walls of the passageway 42 is obviated and assembly of the probe member and guide member 21 under such conditions may be readily accomplished.

It is also important to note that the resilient material of the plug element tends to expand rapidly outwardly as it is deposited in the puncture hole, while the resilient material of the cord section and the tread section of the tire tend to contract from their expanded relation upon withdrawal of the guide sleeve and carried means. Thus an effective pressure-tight seal is provided wherein the material of the tire wall has been worked or acted upon with a minimum of expansion, stretching, or deformation.

It will be understood that other modifications and changes may be made in the tire repair tool and method described above, and any such changes and modifications coming within the scope of the appended claims are embraced thereby.

I claim:

1. In a tire repair device, the combination of: an elongated probe member having a head with a shoulder and having a rigid shank provided with a collar intermediate its ends, said collar defining an upper relieved portion of said shank and a reduced lower grooved portion of said shank and having a tapered lower portion joining said reduced grooved portion, said grooved portion including a continuous spiral groove of selected depth, and a blunt probe tip of reduced section below said grooved portion; and a guide sleeve means including a cylindrical member having a handle with a seat for said shoulder, said cylindrical member having a through passageway for receiving such shank, said passageway having a loose fit over said collar of said shank and said cylindrical member having a length from said seat to terminate at said collar when assembled with said probe member, said cylindrical member having a rounded edge face above the tapered portion of said collar, indicia means on said cylindrical member for indicating depth of penetration of said cylindrical member into a puncture hole in a tire being repaired; said probe member and said guide member being insertable in assembly into a puncture hole for lubricating said hole with a bonding substance and for expanding only the outer portion of said puncture hole after the probe member is withdrawn from said guide member.

2. In a method of repairing a puncture hole in a resilient wall under fluid pressure without substantially reducing said fluid pressure, comprising, the steps of: expanding a puncture hole for preparation of wall surfaces of said hole while blocking said hole to prevent loss of fluid pressure, wiping the inner portion of said puncture hole with cement while maintaining expansion of the outer portion of said hole, inserting a resilient plug element into the outer expanded hole portion and forcing said plug through the inner hole portion until one end of the plug projects beyond interior surfaces of said resilient wall, and then depositing said resilient plug progressively in said puncture hole from inside to outside while under a condition of longitudinal tension and reduced cross-section.

3. In a method for repairing a puncture hole in a resilient wall under fluid pressure without substantially reducing said fluid pressure, comprising, the steps of: applying a bonding substance to surfaces of said puncture hole while preventing loss of fluid pressure therethrough, simultaneously expanding said hole with that portion of the hole adjacent the outer surface of the tire expanded to a selected opening size and an inner portion of the puncture hole expanded only to a reduced opening and blocking said opening, permitting said reduced opening to contract upon the applied bonding substance while maintaining expansion of said hole adjacent the outer surface of the tire, forcing a plug element into said outer expanded opening and into said inner portion of said puncture hole until one end of said plug projects beyond interior surfaces of said wall, and sequentially depositing said tensioned plug element in said puncture hole.

4. A probe member for positive deposit of a bonding substance in a puncture hole comprising: a solid, rigid, elongated member having a handle fixed to one end, said member including a tip portion of reduced section at its other end, said tip portion being provided with striations pitched to the right, said member including a grooved portion adjacent said tip portion and including grooves pitched to the left and adapted to carry a bonding substance whereby insertion of said probe member into a puncture hole while turning said probe member to the right positively drives said bonding substances into said hole for wiping surfaces of said hole with said bonding substance.

5. A probe member as stated in claim 4, wherein said grooves pitched to the left are in the form of a continuous spiral groove.

References Cited in the file of this patent
UNITED STATES PATENTS

| | | |
|---|---|---|
| 417,580 | Page | Dec. 17, 1889 |
| 490,369 | Sloper | Jan. 24, 1893 |
| 639,986 | Isbills | Dec. 26, 1899 |
| 725,171 | Sutton | Apr. 14, 1903 |
| 1,045,511 | Carlson | Nov. 26, 1912 |
| 2,271,339 | Hawkinson | Jan. 27, 1942 |
| 2,646,707 | Notz | July 28, 1953 |
| 2,869,408 | Badowski | Jan. 20, 1959 |
| 2,990,736 | Crandall | July 4, 1961 |
| 3,029,671 | Clifford | Apr. 17, 1962 |